United States Patent [19]

Gaiser et al.

[11] 4,455,830
[45] Jun. 26, 1984

[54] MASTER CYLINDER

[75] Inventors: Robert F. Gaiser, Stevensville; Larry G. Lohraff, Berrien Springs, both of Mich.; Lawrence R. Myers, South Bend, Ind.

[73] Assignee: The Bendix Corporation, Southfield, Mich.

[21] Appl. No.: 298,708

[22] Filed: Sep. 2, 1981

[51] Int. Cl.³ .............................................. B60T 11/20
[52] U.S. Cl. ........................................ 60/562; 60/574; 60/578; 60/581; 60/588; 60/592
[58] Field of Search ................ 60/562, 574, 575, 581, 60/585, 588, 591, 592, 578, 589

[56] References Cited

U.S. PATENT DOCUMENTS

| 4,086,770 | 5/1978 | Shaw ......................................... 60/592 |
| 4,133,178 | 1/1979 | Brooks, Sr. .............................. 60/578 |
| 4,249,381 | 2/1981 | Gaiser ...................................... 60/592 |
| 4,254,624 | 3/1981 | Gaiser ...................................... 60/591 |
| 4,329,846 | 5/1982 | Gaiser ...................................... 60/562 |

FOREIGN PATENT DOCUMENTS 679713  1/1930  France ................................. 60/581

Primary Examiner—Robert E. Garrett
Assistant Examiner—Scott L. Moritz
Attorney, Agent, or Firm—Paul David Schoenle; Ken C. Decker

[57] ABSTRACT

A master cylinder includes a sleeve (31) which defines fixed positions for a pair of seals (30, 32). A pair of pistons (36, 38) cooperate with the seals (30, 32) to form pressure chambers (40, 42) which communicate fluid pressure to brake circuits during braking. A bearing member (44) cooperates with one (36) of the pistons to define an auxiliary pressure chamber (50) and the bearing member (44) is provided with an additional passage (140) for communicating fluid into and out of the auxiliary pressure chamber as well as an end (46) directing movement of the one piston (36).

3 Claims, 4 Drawing Figures 4,455,830

MASTER CYLINDER

This invention relates to a master cylinder in which a sleeve defines fixed positions for a pair of seals and a pair of pistons cooperate with the seals to define a pair of pressure chambers. Also, a bearing retains the sleeve within the master cylinder housing and cooperates with one of the pistons to define a fast-fill or auxiliary pressure chamber.

U.S. Pat. No. 4,249,381, Robert F. Gaiser, issued Feb. 10, 1981 shows a master cylinder for displacing fluid during braking.

In U.S. Pat. application Ser. No. 130,671, filed Mar. 17, 1980, a bearing is disposed within a master cylinder housing bore to engage the sleeve. A primary piston is stepped to define a reduced diameter section engageable with a seal and an enlarged diameter section is engageable with the bearing to define the fast-fill chamber between the bearing and the primary piston. In order to communicate fluid from the fast-fill chamber to the reservoir, a single fluid path is established via end slots on the bearing and these end slots also form one of two paths between the fast-fill chamber and one of the pressure chambers. Moreover, a washer between the seal and the end of the bearing protects the seal and substantially retains the end of the piston concentrically within the housing bore. With only one fluid path between the reservoir and the fast-fill chamber, it is possible for contaminants in the fluid to substantially alter the fluid flow characteristics of the master cylinder during braking.

The present invention provides an improvement for the above identified application, and, in particular, comprises a housing with a longitudinal bore for receiving a pair of movable pistons, a reservoir for carrying fluid which is communicated to the bore, the pistons cooperating with the housing to substantially form a pair of pressure chambers within the bore, a bearing member disposed within the housing bore and engaging one of the pair of pistons, the bearing member cooperating with the one piston to substantially form an auxiliary pressure chamber, a pair of seals cooperating with the pistons when the pair of pistons are moved to close communication between the pair of pressure chambers and the reservoir, the one piston being movable to communicate fluid from the auxiliary pressure chamber to one of the pair of pressure chambers, characterized by said bearing member including a first end remote from the pair of pressure chambers and a second end adjacent one of said pair of seals said second end including a radially inwardly extending flange engageable with said one piston, said second end also defining an outer recess forming a pocket communicating with the reservoir and said second end further including a passage extending from said auxiliary pressure chamber to said pocket in order to provide an additional passage for communicating the auxiliary pressure chamber with the one pressure chamber.

It is an advantage of the present invention that a bearing is engageable with one of the pistons at spaced positions to substantially prevent radial movement of the piston during braking and the bearing is also adapted to provide a plurality of flow paths between a fast-fill chamber, a pressure chamber and a reservoir.

FIG. 4 is an enlarged view of the circumscribed portion 4 of FIG. 1.

Figure 1:
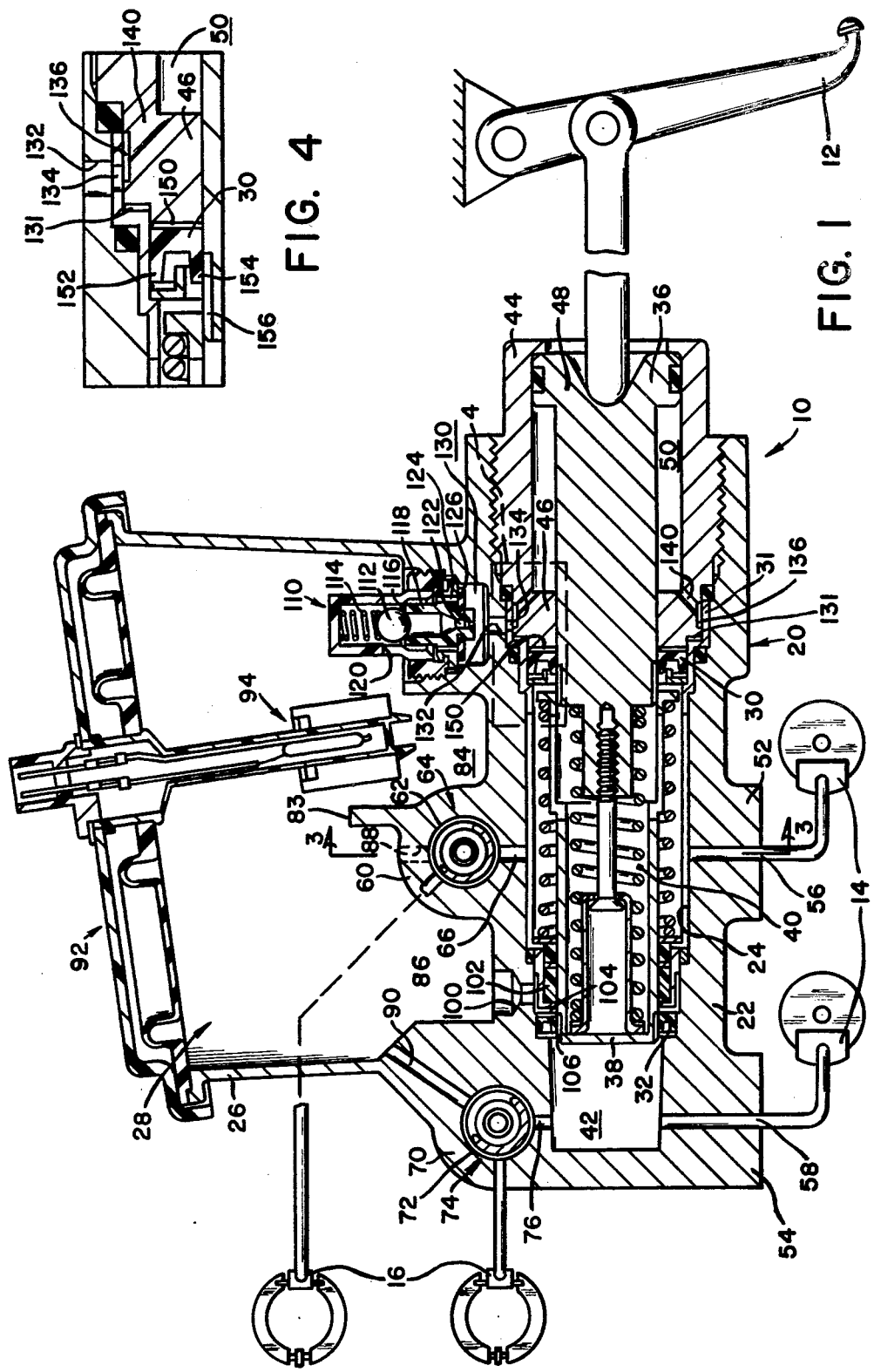
FIG. 1 is a side cross section of a master cylinder constructed in accordance with the present invention.
Figure 2:
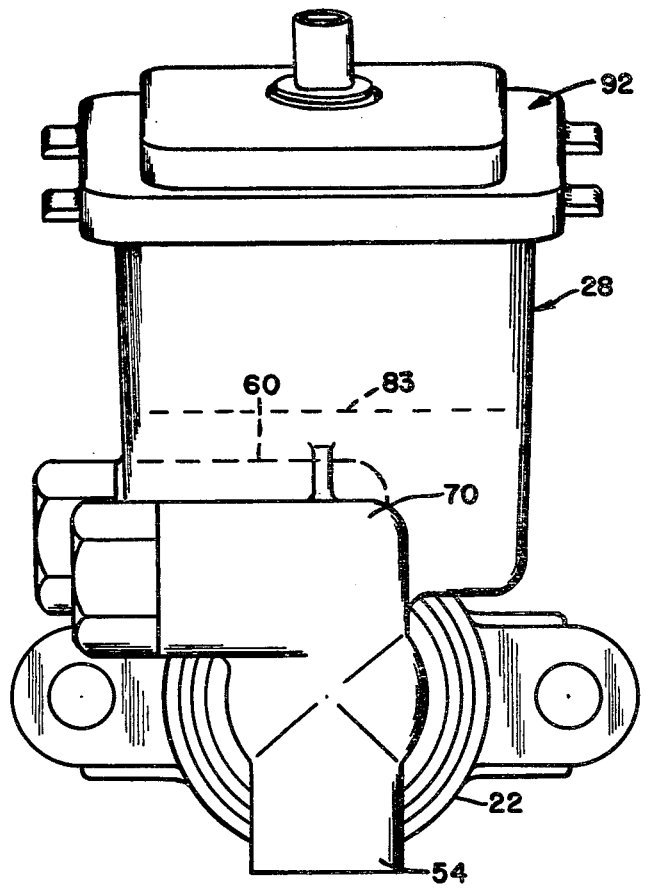
FIG. 2 is a left end view of the master cylinder shown in FIG. 1.

In FIG. 1 the master cylinder is generally referred to as reference numeral 10. The master cylinder 10 is arranged in a vehicle such that a brake pedal 12 is connected to the master cylinder to control actuation of the latter and fluid conduits connect the master cylinder 10 with a pair of front brakes 14 and a pair of rear brakes 16.

The master cylinder 10 is made in a die cast process from a metallic material, such as aluminum. A housing 20 forms a longitudinally extending cylindrical body portion 22 with a stepped bore 24 therein. The housing also forms a circumferential wall 26 extending from the body 22 normal to an axis for the bore in order to form a reservoir 28 for carrying brake fluid. A sleeve 31 is carried within the bore to define fixed positions for a pair of lip seals 32 and 30. A pair of pistons 36 and 38 cooperate with the wall of bore 24 and with the seals 32 and 30 to define a pair of pressure chambers 40 and 42. A bearing 44 extends into the housing bore 24 and is threaded for attachment to a threaded portion of the wall of bore 24. The bearing forms a radially inward end 46 engageable with the first piston 36 while a radially outward end 48 on the first piston 36 is sealingly engageable with the bearing 44. An auxiliary chamber 50 is formed by a radial spacing between the first piston 36 and the bearing 44.

The housing 20 forms a pair of downwardly directed projections 52 and 54 which define outlet openings 56 and 58, respectively. These outlet openings communicate with the respective pressure chambers 40 and 42 and with the front brake assemblies 14 so that fluid pressure generated in each pressure chamber is communicated to a respective front brake. The housing 20 further forms a first boss 60 which extends radially outwardly of the cylindrical body portion 22 and into the reservoir 28. The boss 60 defines a bore 62 with an axis normal to the axis of bore 24 and a proportioning valve assembly 64 is disposed within the bore 62. The bore 62 forms a portion of an outlet passage 66 to communicate pressure chamber 40 with one of the rear brakes 16 via the proportioning valve assembly 64. In a similar manner the housing 20 also forms a second boss 70 which extends radially outwardly of the cylindrical body portion 22. The second boss 70 is connected with the circumferential wall 26 to form an outer boundary for the reservoir 28. The second boss 70 defines a bore 72 with an axis normal to the axis of bore 24 and a proportioning valve assembly 74 is disposed with the bore 72. The bore 72 is disposed slightly closer to the bore 24 than is the bore 67. The bore 72 forms a portion of an outlet passage 76 to communicate pressure chamber 42 with the other of the rear brakes 16 via the proportioning valve assembly 74.

Figure 3:
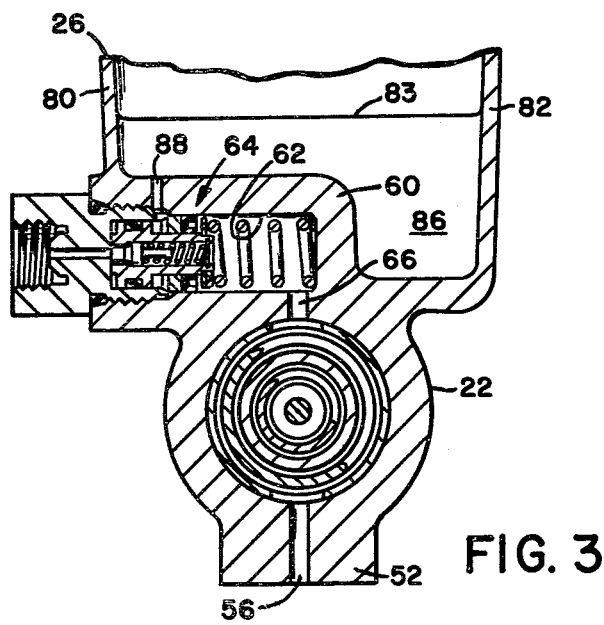
FIG. 3 is a cross section taken along line 3—3 of FIG. 1.

Viewing FIGS. 1 and 3, it is seen that the boss 60 extends from one side 80 of the circumferential wall 26 to a position in the reservoir which is more than one-half the distance between the one side 80 and an opposite side 82. Integrally formed with the boss 60 is a plate 83 extending between the sides 80 and 82 to form separate fluid carrying cavities 84 and 86 within the reservoir 28. As shown in FIG. 1, the plate 83 is offset on the boss 60 to provide room for a boss vent port 88 permitting fluid compensation to the proportioning valve assembly 64 from the reservoir. Similarly, the boss 70 forms a vent port 90 extending between the reservoir and the proportioning valve assembly 74.

The reservoir 28 is enclosed by a cover assembly 92 which carries a fluid level indicator 94 extending into the cavity 84.

Fluid carried within the reservoir 28 communicates with the pressure chamber 42 via a housing port 100, a clearance 102 between the sleeve and the wall of housing bore 24, a radial passage 104 between the left end of sleeve 31 and the right end of seal 32 and notches 106 on the left end of the piston 38. A valve assembly 110 is carried by the housing 22 within the reservoir 28 to control fluid communication to the pressure chamber 40 and the auxiliary chamber 50. The valve assembly comprises a ball valve member 112 biased by spring 114 against a notched seat 116 formed by body 118. The body forms slots 120 leading to a restricted bore 122 via the notch in seat 116 and also leading to openings 124 which normally are covered by a flapper valve 126. The restricted bore 122 communicates with the auxiliary chamber via a chamber 130, a housing port 132, a sleeve opening 134, an outer recess 136 formed on the end 46 of bearing 44, and a bearing opening 140. Also, the restricted bore 122 communicates with the pressure chamber 40 via a spacing formed axially and radially between the bearing 44 and the sleeve 31, radial slots 150 formed at the left end of bearing 44, lips 152 and 154 on seal 30 and notches 156 on the piston 36.

During a brake application, the piston 36 is moved to the left viewing FIG. 1, so that the volume of auxiliary chamber 50 is contracted. Fluid pressure generated in auxiliary chamber 50 is communicated through the interface between end 46 and piston 36 to the notches 156 past the inner lip 154 to establish a first fluid path from the chamber 50 to the chamber 40. Fluid pressure is also communicated from the interface at end 46 and piston 36 to the radial slots 150 and past the outer lip 152 of seal 30 to establish a second fluid path from the chamber 50 to the chamber 40. A third fluid path from chamber 50 to chamber 40 is established by the bearing opening 140, the outer recess 136, the interface or spacing 131 between the end 46 of bearing 44 and the sleeve 31 and past the outer lip 152 of seal 30. The second and third fluid paths between chambers 50 and 40 assume fluid will flow radially outwardly within the slots 150, however, it is possible for the fluid to flow radially inward within slots 150, thereby establishing two fluid paths from the outer recess 136 to the chamber 40 in addition to the already mentioned first fluid path.

Fluid pressure generated in the chamber 50 is also communicated to the reservoir 28 via a fluid path comprising the interface between end 46 and piston 36, slots 150, the interface between end 46 and sleeve 31, spacing 132, the outer recess 136, sleeve opening 134, port 132, chamber 130 and restricted bore 122. A second fluid path to the reservoir 28 is defined by bearing opening 140, outer recess 136, sleeve opening 134, port 132, chamber 130 and restricted bore 122. The fluid paths from the chamber 50 to the reservoir 28 both include the restricted bore 122 so that initially a greater portion of the fluid pressure generated in chamber 50 is communicated to the chamber 40 rather than to the reservoir 28.

With the piston 36 moving to the left, the fluid pressure within chamber 40 cooperates with the spring connecting the pistons 36 and 38 to move the piston 38 in order to generate fluid pressure within chamber 42. At some predetermined pressure level for chamber 50, the ball valve 112 is separated from the notched seat so that chamber 50 is opened to the reservoir thereby restricting the pressure within chamber 50 acting against further movement of piston 36. The fluid pressure within each chamber 40 and 42 is further communicated to the brakes 14 and 16. At some predetermined pressure level for chambers 40 and 42, the proportioning valve assemblies within the bosses 60 and 70 are operable to restrict fluid pressure communication to the rear brakes 16. Upon termination of braking, the springs within the bore 24 bias the pistons to return to the rest position illustrated in FIG. 1.

In the rest position, the chamber 42 is in fluid communication with the reservoir cavity 86 as earlier described and the chamber 40 is also in fluid communication with the reservoir. As the piston 36 moves to the right upon termination of braking, the chamber 40 and the chamber 50 are expanded to reduce the fluid pressure therein. If the fluid trapped within the brake circuits is insufficient to fill the expanding pressure chambers 40 and 50, a pressure differential is created across the flapper valve 126 so that the valve opens to permit fluid from the reservoir to communicate with the chamber 130 and also with the chambers 40 and 50.

We claim:

1. A master cylinder comprising a housing with a longitudinal bore for receiving a pair of movable pistons, a reservoir for carrying fluid which is communicated to the bore, the pistons cooperating with the housing to substantially form a pair of pressure chambers within the bore, a bearing member disposed within the housing bore and engaging one of the pair of pistons, the bearing member cooperating with the one piston to substantially form an auxiliary pressure chamber, a pair of seals cooperating with the pistons when the pair of pistons are moved to close communication between the pair of pressure chambers and the reservoir, the one piston being movable to communicate fluid from the auxiliary pressure chamber to one of the pair of chambers, characterized by said bearing member including an end adjacent one of said pair of seals and including a radially inwardly extending integral flange engageable with said one piston to form an interface therebetween extending over a length on said one piston equal to or greater than the length of engagement between said one seal and said one piston, said end also defining an outer recess forming a pocket communicating with the reservoir and said end further including an opening intersecting said bearing member and extending from said auxiliary pressure chamber to said pocket, said interface between said flange and said one piston defining a first fluid passage for communicating the auxiliary pressure chamber to the one pressure chamber via an inner part of the one seal and also via an outer part of the one seal, and said bearing member opening defining a second fluid passage for communicating the auxiliary pressure chamber to the one pressure chamber via the inner and outer parts of the one seal, said second fluid passage being independent of said interface.

2. The master cylinder of claim 1 in which a sleeve is disposed within the housing bore to substantially define fixed positions for the pair of seals and said end of said bearing is engageable with both said sleeve and the one piston.

3. The master cylinder of claim 1 in which said outer recess is longitudinally spaced inwardly from said auxiliary pressure chamber and said opening comprises a slanted opening extending from said outer recess to said auxiliary pressure chamber.

* * * * *